(12) United States Patent
Wang (10) Patent No.: US 8,499,105 B2
(45) Date of Patent: Jul. 30, 2013

(54) BUFFER MANAGER AND BUFFER MANAGEMENT METHOD BASED ON ADDRESS POINTER LINKED LIST

(75) Inventor: Bin Wang, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 231 days.

(21) Appl. No.: 12/782,823

(22) Filed: May 19, 2010

(65) Prior Publication Data

US 2010/0299460 A1 Nov. 25, 2010

(30) Foreign Application Priority Data

May 20, 2009 (CN) .......................... 2009 1 0084133

(51) Int. Cl.
*G06F 3/00* (2006.01)

(52) U.S. Cl.
USPC ................... 710/52; 710/53; 710/54; 710/55; 710/56; 710/57

(58) Field of Classification Search
None
See application file for complete search history.

(56) References Cited

U.S. PATENT DOCUMENTS

| | | | | |
|---|---|---|---|---|
| 5,432,908 A | * | 7/1995 | Heddes et al. | 711/147 |
| 5,835,944 A | * | 11/1998 | Lahti et al. | 711/118 |
| 6,049,802 A | * | 4/2000 | Waggener et al. | 707/800 |
| 6,233,244 B1 | * | 5/2001 | Runaldue et al. | 370/412 |
| 6,668,311 B2 | * | 12/2003 | Hooper et al. | 711/170 |
| 6,714,553 B1 | * | 3/2004 | Poole et al. | 370/412 |
| 6,826,354 B2 | * | 11/2004 | Tezuka | 382/218 |
| 7,031,331 B2 | * | 4/2006 | Schaub | 370/412 |
| 7,417,986 B1 | * | 8/2008 | Sandoval et al. | 370/381 |
| 7,536,488 B2 | * | 5/2009 | Chen et al. | 710/56 |
| 2002/0131419 A1 | * | 9/2002 | Tamai | 370/395.4 |
| 2007/0274303 A1 | * | 11/2007 | Cui et al. | 370/363 |
| 2008/0028148 A1 | * | 1/2008 | Wallner et al. | 711/118 |

FOREIGN PATENT DOCUMENTS

| | | |
|---|---|---|
| CN | 1522011 A | 8/2004 |
| CN | 1780254 A | 5/2006 |
| CN | 1819544 A | 8/2006 |
| CN | 101094183 A | 12/2007 |
| CN | 101122886 A | 2/2008 |

* cited by examiner

*Primary Examiner* — Henry Tsai
*Assistant Examiner* — Jing-Yih Shyu
(74) *Attorney, Agent, or Firm* — Ladas & Parry LLP (57) ABSTRACT

Embodiments of the present invention provide a buffer manager and a buffer management method based on an address pointer linked list. In the embodiments, address pointers of all buffer blocks in a buffer are divided into several groups, lower bits of address pointers in each group are used to record a linked list between the address pointers in the same group, and an address pointer which is pointed by one predetermined address pointer of each group and is in a different group is further recorded to upbuild a linked list between the groups. Thereby, an address linked list can still be stored without a RAM with a width equal to a pointer depth and with a depth equal to the total number of buffer blocks in the buffer as required by the conventional art, which greatly reduces hardware resources required.

25 Claims, 7 Drawing Sheets

(PRIOR ART)

Figure 1

(PRIOR ART)

Figure 2

| PTRQ | | ---- | FF01 | 5 | 9910 | 7777 | 6543 | ---- | |

(PRIOR ART)

Figure 3

(PRIOR ART)

| ---- | 00004 | 00005 | 00006 | 00007 | 84005 | 84000 | 84001 | 84006 | 84007 | ---- |

BUFFER MANAGER AND BUFFER MANAGEMENT METHOD BASED ON ADDRESS POINTER LINKED LIST

FIELD OF THE INVENTION

The present invention relates to buffer management technologies, and more particularly, to a buffer manager and buffer management method based on an address pointer linked list.

BACKGROUND OF THE INVENTION

Figure 1:
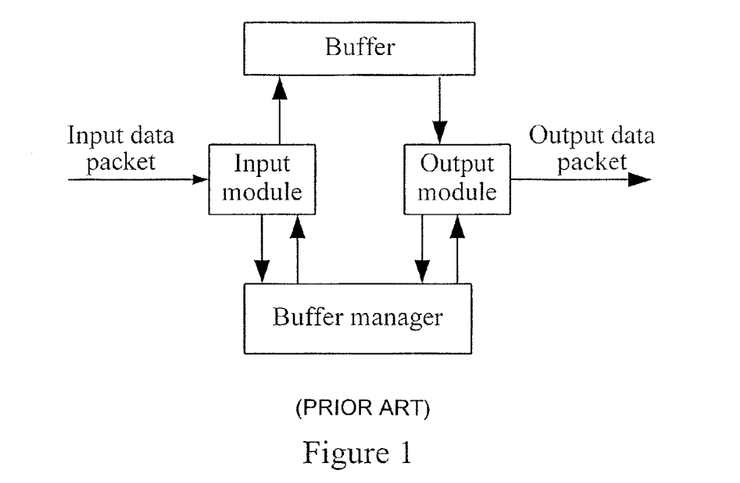
FIG. 1 is a schematic diagram illustrating a structure of a conventional buffer management system.

FIG. 1 is a schematic diagram illustrating a structure of a conventional buffer management system. As shown in FIG. 1, the buffer management system includes a buffer, an input module, an output module and a buffer manager.

The buffer is divided into multiple buffer blocks.

The input module requests the buffer manager for address pointers of idle buffer blocks for each input data packet, and after successfully parsing the input data packet, saves the input data packet respectively into the buffer blocks corresponding to the input data packet according to the requested address pointers and using a block as a unit.

The output module requests to look up the buffer manager for address pointers of buffer blocks corresponding to a data packet to be transmitted, reads the complete data packet from the buffer blocks in turn according to the found address pointers, and transmits the complete data packet.

Because the buffer blocks respectively storing continuous data of one data packet are not continuous, the buffer manager needs to maintain an address pointer linked list adapted to record a next address pointer of each requested address pointer. The buffer manager can thus continuously find the continuous data of one data packet and enable the output module to read and transmit the data packet.

In addition, the buffer manager is not only adapted to request for the address pointers and look up for the address pointers, but also to release the address pointers of the buffer blocks corresponding to the data packet after the output module transmits the complete data packet and the input module learns that the data packet is incorrectly-parsed.

Figure 2:
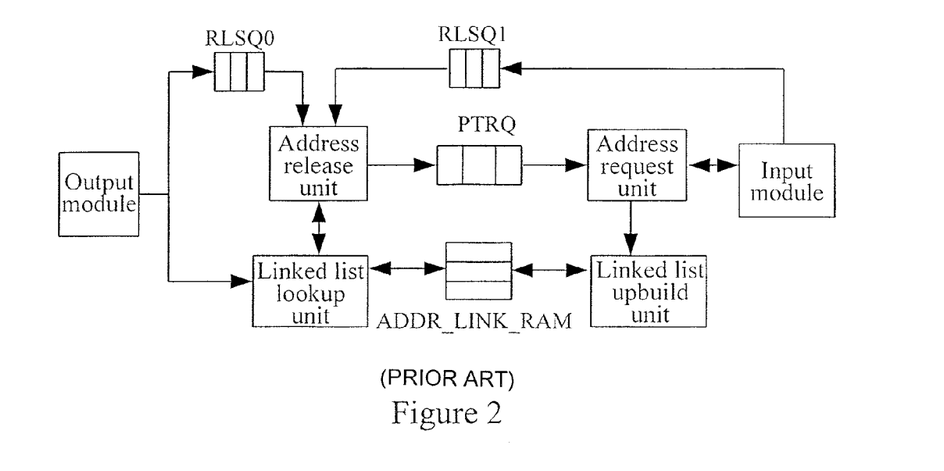
FIG. 2 is a schematic diagram illustrating an internal logic structure of a conventional buffer manager.

FIG. 2 is a schematic diagram illustrating an internal logic structure of a conventional buffer manager. As shown in FIG. 2, the buffer manager includes the following.

Figure 3:
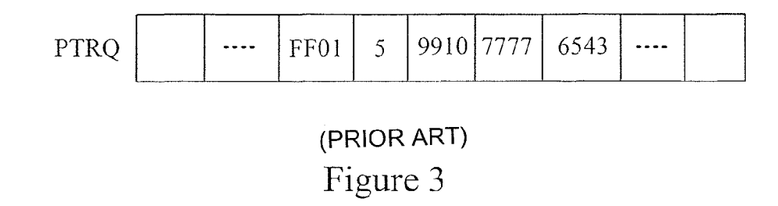
FIG. 3 is a schematic diagram illustrating an example of an idle address pointer queue recorded in a conventional idle pointer unit.

An idle pointer unit, shown as a POINTER QUEUE (PTRQ), is a First In First Out memory (FIFO) with a width equal to the depth of an address pointer and with a depth equal to the total number of buffer blocks in the buffer. Idle address pointers of idle buffer blocks in the buffer are recorded in the PTRQ. FIG. 3 is a schematic diagram illustrating an example of an idle address pointer queue recorded in the PTRQ. During initialization, all the buffer blocks in the buffer are idle, and correspondingly, all the address pointers are recorded in the PTRQ as the idle address pointers.

An address request unit, when the input module starts to parse the input data packet, is adapted to request, from the idle address pointers recorded in the PTRQ, for the address pointers of the buffer blocks corresponding to each continuous block of data in the input data packet in turn, so that the input module can save a correctly-parsed data packet into the buffer blocks in the buffer.

A first address release information storing unit, shown as a RELAESE QUEUE 1 (RLSQ1) of the input module in FIG. 2, is a FIFO with a width equal to the depth of the address pointer. When parsing the input data packet, the input module can not learn whether the input data packet is incorrect until the end of the input data packet is parsed;

because the address pointers of the buffer blocks are requested corresponding to all the continuous blocks of data in the input data packet, if the input data packet is incorrect, the input module records requested address information of the incorrectly-parsed input data packet into the RLSQ1. The requested address information contains the address pointer of the header of the incorrectly-parsed input data packet, and the number of the buffer blocks occupied by the input data packet.

Figure 4:
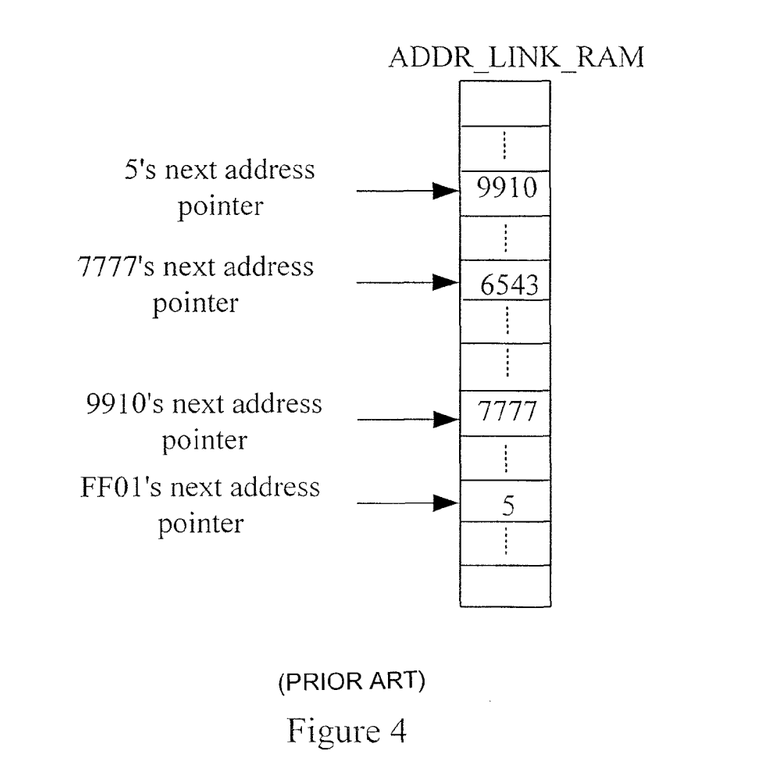
FIG. 4 is a schematic diagram illustrating an example of address pointers recorded in a conventional linked list information unit.

A linked list information unit is a Random Access Memory (RAM) with a width equal to the depth of the address pointer and with a depth equal to the total number of the buffer blocks in the buffer. In FIG. 2, the RAM is shown as an ADDR_LINK_RAM and is adapted to record the next address pointers inters of requested address pointers. Based on an arrangement sequence of the address pointers shown in FIG. 3, FIG. 4 illustrates an example of the next address pointers of the requested address pointers respectively recorded in the ADDR_LINK_RAM.

A linked list UpBuild unit writes a currently-requested address pointer into a position corresponding to a previously-requested address pointer in the ADDR_LINK_RAM so as to indicate that the currently-requested address pointer is the next address pointer pointed by the previously-requested address pointer.

A linked list Lookup unit, before the output module reads continuous blocks of data of one data packet from the buffer, looks up the next address pointers corresponding to the requested address points in the ADDR_LINK_RAM in turn so as to make the output module read the data packet from buffer blocks in the buffer.

A second address release information storing unit, shown as a RELAESE QUEUE 2 (RLSQ0) of the output module, is a FIFO with a width equal to the depth of the address pointer. After reading and outputting the complete data packet, the output module records address information of the output data packet into the RLSQ0. The address information contains the address pointer of the header of the output data packet and the number of the buffer blocks occupied by the output data packet.

An address release unit is adapted to release address pointers indicated by the address information recorded in the RLSQ1 and the RLSQ00 into the PTRQ. However, because the address information recorded in the RLSQ1 and the RLSQ0 only records the address pointers of headers and the number of the buffer blocks occupied by the data packets, only the address pointers of the headers of the data packets can be directly released while the address pointers of the buffer blocks corresponding to the other data blocks need be looked up in turn in the ADDR_LINK_RAM by the linked list Lookup unit.

As can be seen, in the buffer manager shown in FIG. 2, the PTRQ is the FIFO with the width equal to the depth of the address pointer and with the depth equal to the total number of the buffer blocks in the BUFFER. The FIFO occupies a huge number of hardware resources. Suppose that the width is 20 bits and the depth is 220, 20M bits of storage resources are required in order to implement the FIFO. However, the buffer manager is generally implemented by a Field Programmable Gate Array (FPGA) while it is difficult for the FPGA to provide such a huge number of resources. Similar to the PTRQ, the ADDR_LINK_RAM also requires a huge number of storage resources and thus can not be implemented by the FPGA either.

In addition, the conventional buffer manager shown in FIG. 2 needs to look up in the ADDR_LINK_RAM when the output module reads the data packet. Further more, because the address information which needs to be released and is provided by the input module and the output module only records the address pointers of the headers and the number of the buffer blocks occupied by the data packets, the conventional buffer manager also needs to look up in the ADDR_LINK_RAM once again when the address pointers are released. As a result, efficiency for releasing the address pointers is low, and in addition, abnormal packet loss may occur.

SUMMARY OF THE INVENTION

In view of the above, embodiments of the present invention provide a buffer manager and buffer management method based on an address pointer linked list, which save hardware resources.

According to an embodiment of the present invention, a buffer manager based on an address pointer linked list includes:

an idle pointer unit, adapted to record an idle address pointer of an idle buffer block in a buffer; an address request unit, adapted to request for an address pointer from the idle address pointer for an input data packet;

a linked list information unit, adapted to record a next address pointer of the address pointer requested;

a linked list lookup unit, adapted to look up the next address pointer of the address pointer requested;

a first First In First Out memory (FIFO), adapted to record address information of an incorrectly-parsed input data packet;

a second FIFO, adapted to record address information of an output data packet;

an address release unit, adapted to release an address pointer indicated by the address information into the idle pointer unit;

wherein the address pointers of all the buffer blocks in the buffer are divided into groups of a predetermined number; in each group, the address pointers have a same higher bit and different lower bits, one predetermined address pointer is adapted to point to a group different from the each group and the other address pointers respectively is adapted to point to the address pointers in the each group;

wherein the linked list information unit is adapted to record, for each group, lower bits of an address pointer pointed by the address pointer requested, an address pointer pointed by the predetermined address pointer request, and a flag bit indicating whether the predetermined address pointer is occupied; and wherein the address request unit is adapted to request for the address pointer for the input data packet from a group where the predetermined address pointer indicated by the flag bit as not occupied is located, and request for the address pointer in the same group in priority.

According to another embodiment of the present invention, a buffer management method based on an address pointer linked list includes:

recording an idle address pointer of an idle buffer block in a buffer;

requesting for an address pointer from the idle address pointer for an input data packet;

recording a next address pointer of the address pointer requested;

looking up the next address pointer of the address pointer requested;

recording address information of an incorrectly-parsed input data packet and address information of an output data packet;

releasing an address pointer indicated by the address information;

wherein the address pointers of all the buffer blocks in the buffer are divided into groups of a predetermined number; in each group, the address pointers have a same higher bit and different lower bits, one predetermined address pointer is adapted to point to a group different from the each group and the other address pointers respectively is adapted to point to the address pointers in the each group;

wherein the recording the next address pointer of the address pointer requested comprises: recording, for each group, lower bits of an address pointer pointed by the address pointer requested, an address pointer pointed by the predetermined address pointer requested, and a flag bit indicating whether the predetermined address pointer is occupied; and wherein the requesting for the address pointer comprises: requesting for the address pointer for the input data packet from a group where the predetermined address pointer indicated by the flag bit as not occupied is located, and requesting for the address pointer in the same group in priority.

As can be seen from the above technical scheme, the address pointers of all buffer blocks in the buffer are divided into several groups, lower bits of the address pointers in each group are used to record a linked list between the address pointers in each group, and the address pointer which is pointed by the predetermined address pointer of each group and is in a different group is further recorded to upbuild a linked list between the groups. Thereby, different from the conventional art, an address linked list can still be stored even without a RAM with a width equal to the depth of the pointer and with a depth equal to the total number of buffer blocks in the buffer, which greatly reduces hardware resources required.

Preferably, a two-level link RAM is configured, one RAM is with a width equal to lower bits of the address pointers and a depth equal to a difference between the total number of buffer blocks in the buffer and the number of the groups, and another RAM is with a width equal to a depth of the address pointer plus 1 and with a depth equal to the number of the groups. The two-level link RAM is adapted to replace the coventional RAM with a width equal to the depth of the pointer and with a depth equal to the total number of buffer blocks in the buffer. Or alternatively, one RAM is configured with a width equal to "a depth of the address pointer +1" plus the total number of lower bits of address pointers pointing to the ingroup address pointer in each group, and with a depth equal to the number of the groups. The one RAM is adapted to replace the coventional RAM with a width equal to the depth of the pointer and with a depth equal to the total number of buffer blocks in the buffer.

Further more, in an embodiment of the present invention, a RAM with a width equal to 1 and with a depth equal to the total number of the buffer blocks in the buffer to implement the idle pointer unit, so as to replace the conventional RAM with a width equal to the depth of the pointer and with a depth equal to the total number of the buffer blocks in the buffer. Thereby, the hardware resources required are greatly reduced.

Further more, the first FIFO and the second FIFO in an embodiment of the present invention are respectively adapted to record address pointers of all buffer blocks corresponding to an incorrectly-parsed input data packet and record address pointers of all buffer blocks corresponding to the output data packet. While comparatively, the conventional art only records the address pointer of a packet header and the number of the buffer blocks. Thereby, the address release unit in the embodiment need not use the linked list lookup unit to look up but can directly release the address pointers recorded respectively in the first FIFO and the second FIFO into the idle pointer unit in turn. Thereby, efficiency for address release is increased and abnomal packet loss can be avoided.

Preferably, an embodiment of the present invention provides a packet-level FIFO having a packet loss function to implement the first FIFO. Thus, when starting to parse the input data packet, the input module can firstly save the requested address pointers of the buffer blocks corresponding to all data blocks in the input data packet into the packet-level FIFO, and then can flag a storage position of an address pointer of a packet header. If finding that the input data packet is correct after parsing a packet end of the current input data packet, the input module adjusts a next write position of the packet-level FIFO to the flagged storage position of the address pointer of the packet header, so as to ensure that the address pointers of all the buffer blocks corresponding to the successfully-parsed input data packet can be covered by subsequent write operations and would not be stored in the packet-level FIFO. If finding that the input data packet is incorrect after parsing the packet end of the current input data packet, the input module still keeps the next write position of the packet-level FIFO at a next storage position of the address pointer of the packet end, so as to save the address pointers of all buffer blocks corresponding to the incorrectly-parsed input data packet into the packet-level FIFO. Thus, although the input module can learn whether the input data packet is incorrect only after parsing the packet end of the input data packet, the packet-level FIFO having the packet loss function can avoid recording the address pointers of the buffer blocks corresponding to all the data blocks before finishing the parsing.

DETAILED DESCRIPTION OF THE INVENTION

The present invention will be described hereinafter in detail with reference to accompanying drawings and embodiments.

Figure 5:
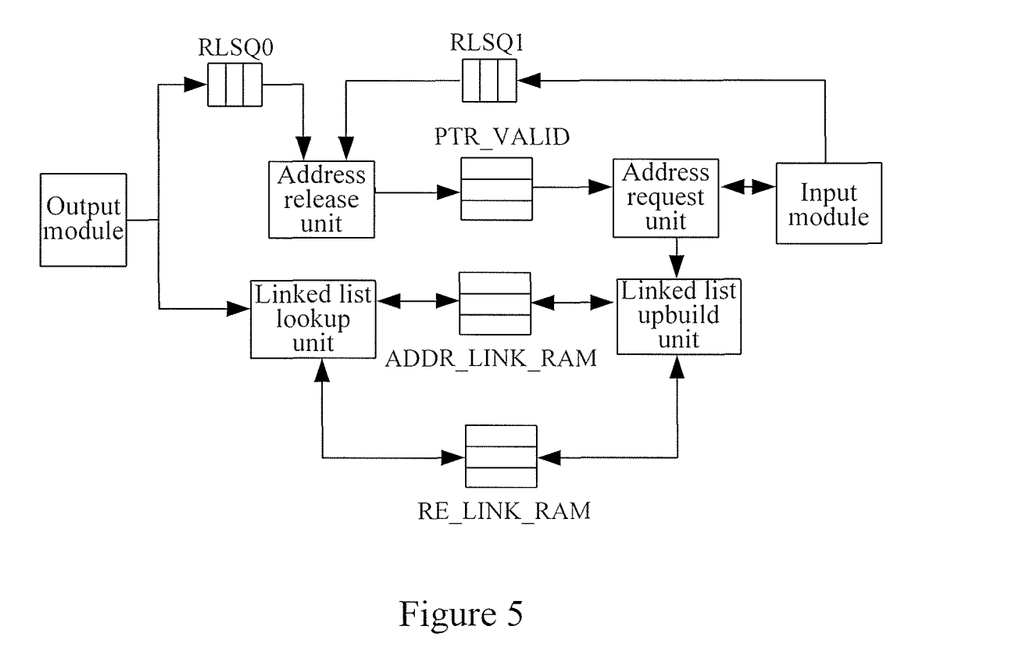
FIG. 5 is a schematic diagram illustrating an internal logic structure of a buffer manager according to an embodiment of the present invention.

FIG. 5 is a schematic diagram illustrating an internal logic structure of a buffer manager according to an embodiment of the present invention. As shown in FIG. 5, the buffer manager include the following.

An idle pointer unit, shown as PTR_VALID, is adapted to record idle address pointers of idle buffer blocks in a buffer. During initialization, all buffer blocks in the buffer are idle, and correspondingly, all address pointers are recorded in the idle pointer unit as the idle address pointers.

Figure 6:
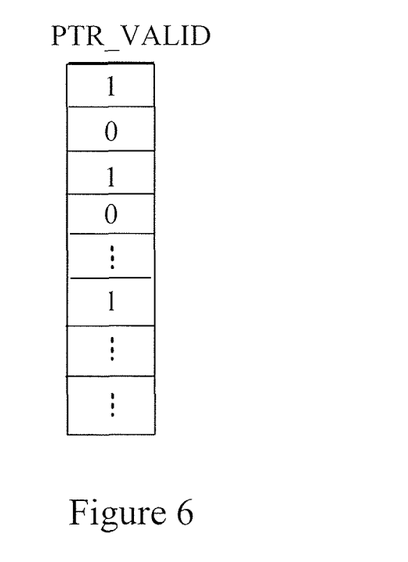
FIG. 6 is a schematic diagram illustrating an example of an idle address pointer queue recorded in an idle pointer unit according to an embodiment of the present invention.

In the embodiment, in order to reduce hardware resources required by the idle pointer unit, the PTR_VALID shown in FIG. 5 is slightly different from the PTRQ shown in FIG. 2. Specifically, the PTR_VALID may just have 1-bit idle pointer indicators corresponding respectively to the address pointers of all the buffer blocks in the buffer one by one, or have relatively small multi-bit idle pointer indicators; each idle pointer indicator indicates whether an address pointer of a buffer block corresponding to the idle pointer indicator is idle. During the initialization, all the idle pointer indicators in the PTR_VALID are set as valid for indicating "not occupied", i.e. idle. FIG. 6 illustrates an example of idle address pointers recorded in the PTR_VALID according to an embodiment of the present invention, where 1 indicates "occupied", i.e. requested, and 0 indicates "not occupied", i.e. idle.

Thus, it is supposed that the PTRQ has a width of m and a depth of $2^n$ and the PTR_VALID has a width of i and a depth of $2^n$, where m is a positive integer larger than 1, i and n are respectively positive integers larger than or equal to 1, and i is smaller than m. Thus, the PTRQ requires m×$2^n$ bits of storage resources in total and the PTR_VALID requires i×$2^n$ bits of storage resources in total. As can be seen, compared with the conventional PTRQ with a width equal to the depth of an address pointer and with a depth equal to the total number of buffer blocks in the buffer, the PTR_VALID can greatly reduce the hardware resources required by the idle pointer unit. Preferably, the PTR_VALID in this embodiment is implemented by a RAM with a width equal to 1 and a depth equal to the total number of the buffer blocks in the buffer. If the hardware resources are sufficient, the idle pointer unit may be the conventional PTRQ shown in FIG. 2.

With respect to the PTR_VALID above, an address request unit selects an address pointer corresponding to a valid idle pointer indicator indicating "idle" as a requested address pointer, notifies an input module of the requested address pointer, and then sets the valid idle pointer indicator as "invalid" to indicate "requested" so as to implement the request for address pointers. Further more, an address release unit sets idle pointer indicators as "valid" to indicate "idle" so as to implement the release of the address pointers; the set idle pointer indicators correspond to address pointers which are to be released and are represented by address information recorded in RLSQ1 and RLSQ0.

A linked list information unit is adapted to record next address pointers of the requested address pointers. In order to reduce the hardware resources required by the linked list information unit, the embodiment improves part of the linked list information unit. Specifically, as shown in FIG. 5, the improved linked list information unit includes a two-level link RAM consisting of an ADDR_LINK_RAM and a RE_LINK_RAM; and the ADDR_LINK_RAM shown in FIG. 5 is slightly different from the ADDR_LINK_RAM shown in FIG. 2.

Figure 7:
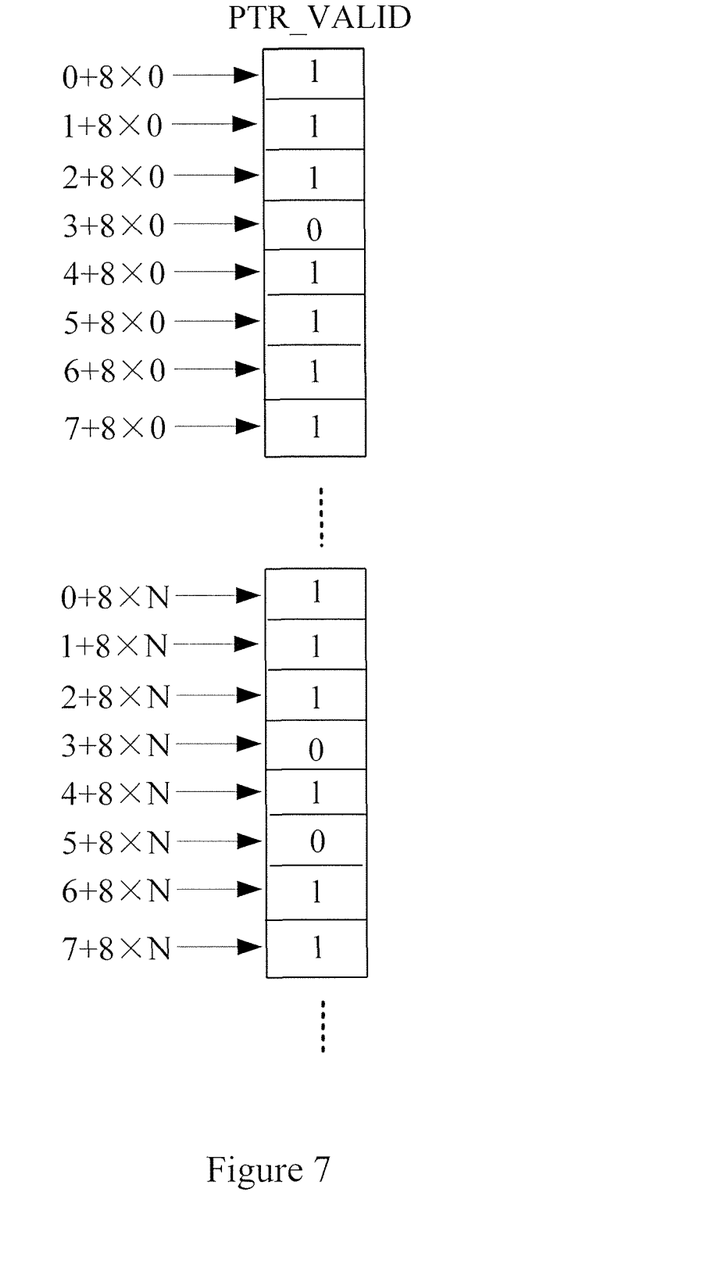
FIG. 7 is a schematic diagram illustrating another example of an idle address pointer queue recorded in an idle pointer unit according to an embodiment of the present invention.

More specifically, in order to cooperate with the two-level link RAM consisting of the ADDR_LINK_RAM and the RE_LINK_RAM, all address pointers of the buffer blocks in the buffer are divided into several groups. By taking each group including 8 address pointers as an example, FIG. 7 illustrates another example of groups recorded in the PTR_VALID, where 1 indicates occupied, i.e. requested, and 0 indicates "not occupied", i.e. idle.

Preferably, an address pointer of each buffer block in each group may be the sum of a preset ingroup number of each buffer block and a product of the total number of the buffer blocks in each group and a group number. Therefore, it can be guaranteed that the address pointers in the same group have the same higher bit and different lower bits. The different lower bit can thus indicate the preset ingroup number of each address pointer, and in each group, the address pointers point to the address pointers in the same group except one predetermined address pointer which can point to another group.

When requesting for an address pointer, the address request unit requests for the address pointer in the same group in priority. Correspondingly, the ADDR_LINK_RAM, as an ingroup record subunit, only records the lower bit of a next address pointer which is pointed by a requested address pointer in each group and is in the same group as the requested address pointer.

When all address pointers in the same group are requested, it is needed to continue requesting for an address pointer in another group. Since the ADDR_LINK_RAM only records the preset ingroup number, the RE_LINK_RAM is used as an intergroup record subunit to record a next address pointer which is pointed by one predetermined address pointer in each group and is not in the same group as the predetermined address pointer, and record a flag bit indicating that a requested predetermined address pointer is occupied. Generally, the address pointer in each group for pointing to another group may be a last address pointer in this group.

Thus, the ADDR_LINK_RAM may be implemented by a RAM with a width equal to the lower bit of the address pointer and with a depth equal to a difference between the total number of the buffer blocks in the buffer and the number of groups. That the depth is equal to the difference between the total number of the buffer blocks in the buffer and the number of groups is because each group has one address pointer which points to another group and is not recorded in the ADDR_LINK_RAM. The RE_LINK_RAM may be implemented by a RAM with a width equal to the depth of an address pointer plus 1 and with a depth equal to the number of groups. Compared with $m \times 2^n$ bits of storage resources occupied by one conventional RAM with a width equal to the depth of the address pointer and with a depth equal to the total number of the buffer blocks in the buffer, the two RAMs implementing the linked list information unit require "$m' \times (2^n - p) + (m+1) \times p$" storage resources in total, which can reduce the hardware resources required by the linked list information unit; m' represents the lower bit of the address pointer and is smaller than m, p represents the number of groups and is smaller than or equal to $2^{n-1}$.

Figure 8:
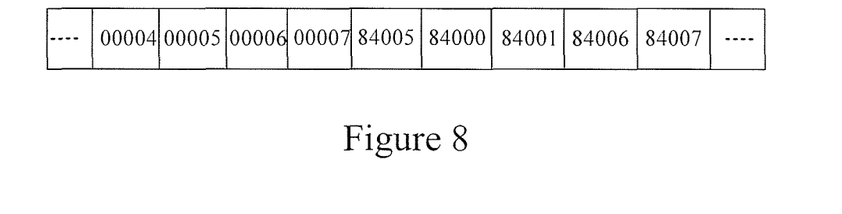
FIG. 8 is a schematic diagram illustrating an example of an arrangement sequence of address pointers actually occupied by a data packet according to an embodiment of the present invention.
Figure 9:
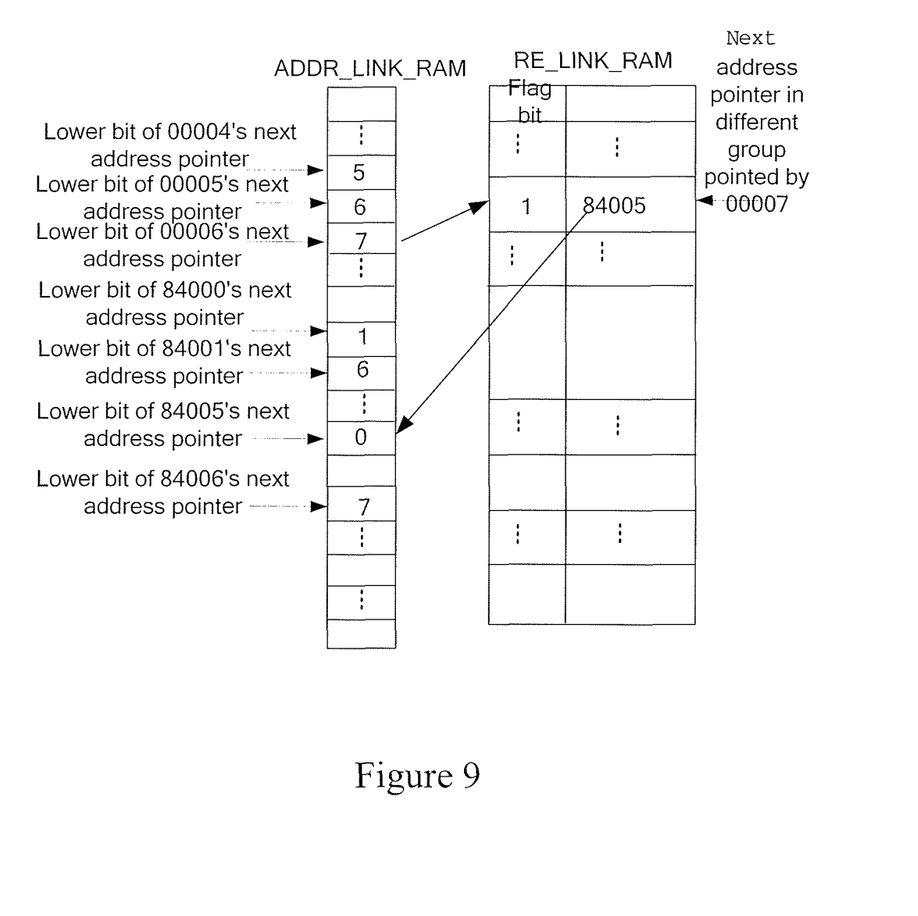
FIG. 9 is a schematic diagram illustrating an example of address pointers recorded in a linked list information unit according to an embodiment of the present invention.

Still taking each group including 8 address pointers as an example, according to an arrangement sequence of the address pointers actually occupied by the data packet shown in FIG. 8, FIG. 9 illustrates an example in which the ADDR_LINK_RAM records lower 3 bits of next address pointers in one group and the RE_LINK_RAM records a complete address pointer which is pointed by a predetermined address pointer in the one group and is not in the one group. 00004~00007 represent the address pointers in the $0^{th}$ group and 84000~84007 represent the address pointers in the $10500^{th}$ group.

Or alternatively, the ADDR_LINK_RAM and the RE_LINK_RAM may be combined into one RAM. The combined RAM has a width equal to the total lower bits of address pointers pointing to an ingroup address pointer in each group plus "a depth of an address pointer +1", i.e. $m' \times$(the total number of address pointers in each group−1) +m+1; and has a depth equal to the number of groups p. Thus, the combined RAM requires [$m' \times$(the total number of address pointers in each group−1) +m+1]×p storage resources. Compared with the $m \times 2^n$ storage resources required conventionally, the combined RAM can still reduce the hardware resources required by the linked list information unit.

Figure 10:
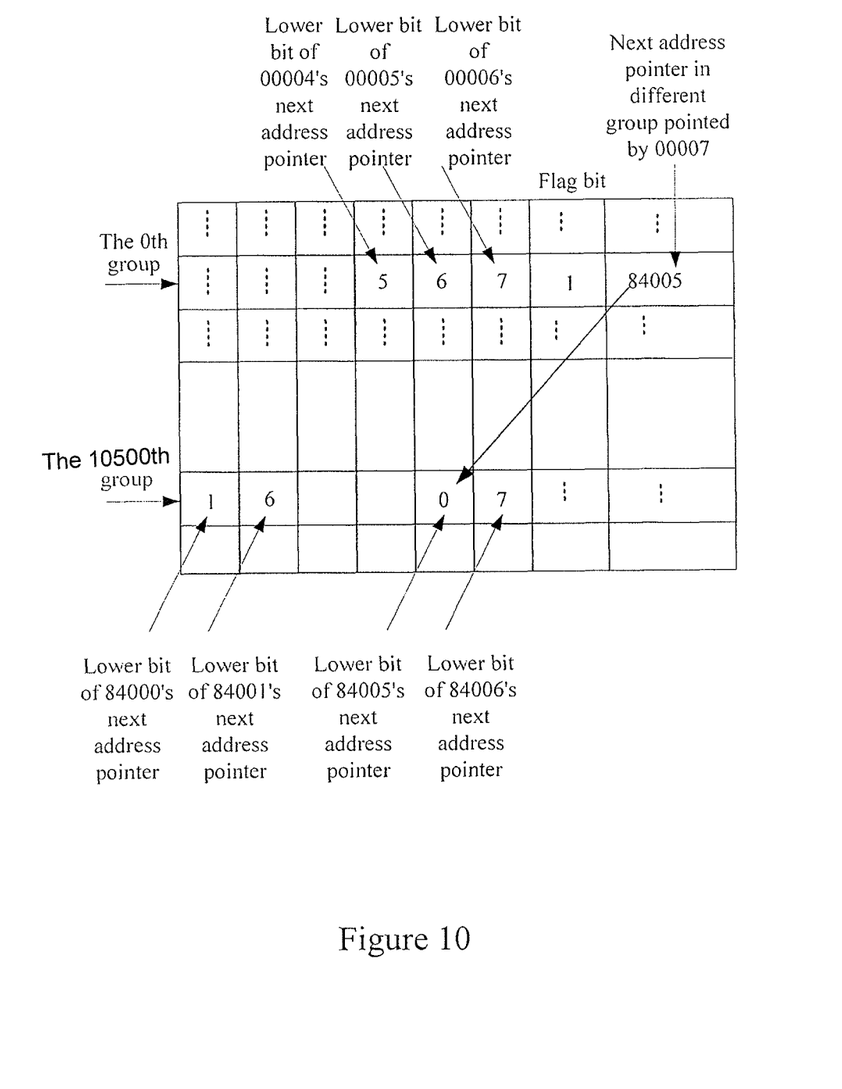
FIG. 10 is a schematic diagram illustrating another example of address pointers recorded in a linked list information unit according to an embodiment of the present invention.

Still taking each group including 8 address pointers as an example, according to an arrangement sequence of the address pointers actually occupied by the data packet shown in FIG. 8, FIG. 10 illustrates an example of one RAM recording lower 3 bits of next address pointers in one group as well as a complete address pointer which is pointed by a predetermined address pointer in the one group and is not in the one group. 00004~00007 represent the address pointers in the $0^{th}$ group and 84000~84007 represent the address pointers in the $10500^{th}$ group.

It should be noted that, because each group only has one address pointer pointing to a different group, i.e. all the other address pointers except the predetermined address pointer in the group point to this group, if a flag bit of the predetermined address pointer pointing to a different group indicates "occupied", the other address pointers in this group may not be requested either even if they are idle, so as to ensure the link between address pointers across different groups.

Correspondingly, after the requested predetermined address pointer corresponding to the flag bit indicating "occupied" is released, a linked list upbuild unit sets the flag bit of the predetermined address pointer as "not occupied"; the address request unit requests for the address pointers of the input data packet from the group where the predetermined address pointer with the flag bit set as "not occupied" is located and performs the request from the same group in priority. In addition, the linked list lookup unit connected with the output module can thus look up the address pointers according to the above rule; and according to the address pointers, the output module can read an output data packet from the buffer.

In addition, in this embodiment the RLSQ1 of the input module and the RLSQ0 of the output module shown in FIG. 5 may be the same as those shown in FIG. 2. However, in order to increase efficiency for releasing an address pointer, the embodiment improves part of working principles of the RLSQ1, the RLSQ0 and the address release unit as follows:

The RLSQ1 is an FIFO with a width equal to the depth of the address pointer. However, different from the conventional art, the FIFO records the address pointers of all buffer blocks corresponding to the incorrectly-parsed input data packet, instead of just recording the address pointer of the packet header of the incorrectly-parsed input data packet and the number of buffer blocks occupied by the incorrectly-parsed input data packet.

The RLSQ0 is an FIFO with a width equal to the depth of the address pointer. However, different from the conventional art, the FIFO records the address pointers of all buffer blocks corresponding to the output data packet, instead of just recording the address pointer of the packet header of the output data packet and the number of buffer blocks occupied by the output data packet.

Thus, the address release unit can directly release the address pointers recorded in the RLSQ1 and the RLSQ0 into the idle pointer unit without using the linked list lookup unit. In other words, the buffer manager shown in FIG. 5 needs to use the linked list lookup unit to look up in the linked list information unit only when the output module reads a data packet, while does not need to look up in the linked list information unit again when releasing an address pointer. Thereby, efficiency for releasing an address pointer is increased and abnormal packet loss can also be avoided.

In addition, with respect to the RLSQ0, when reading and outputting each data block of a complete data packet one by one, the output module may save an address pointer of a buffer block corresponding to each read and outputted data block into the RLSQ0 in real time one by one, which is different from the conventional art in which the address information to be released is saved into the RLSQ0 only after one complete data packet is outputted. However, with respect to the RLSQ1, because the input module can not learn whether the input data packet is incorrect until finishing parsing the packet end of the input data packet, the input module can not determine whether the address pointers of the buffer blocks corresponding to all data blocks of the input data packet need to be saved into the RLSQ1 to be released until finishing parsing the input data packet. Thus, if the RLSQ1 is implemented by the FIFO, it is required to additionally record the address pointers of the buffer blocks corresponding to all data blocks of a currently-parsed input data packet.

In order to avoid recording the address pointers of the buffer blocks corresponding to all data blocks before finishing parsing, the embodiment provides a packet-level FIFO having a packet loss function to implement the RLSQ1. The packet-level FIFO is an improvement of a conventional packet-level FIFO.

Besides a storage queue, the conventional packet-level FIFO further includes signal ports as follows: a write address pointer indicating a current write address, a read address pointer indicating a current read address, a header address pointer indicating a packet header, an end address pointer indicating an packet end. Further, the conventional packet-level FIFO includes a counter adapted to calculate all the stored data so as to determine whether the packet-level FIFO is full.

In order to make the conventional packet-level FIFO have the packet loss function, the embodiment further adds extra signal ports including a loss signal and a copy signal into the conventional packet-level FIFO. If the loss signal is set as valid, the write address pointer returns to a packet header write address from a corresponding packet end write address; otherwise, the write address pointer still stays at its current position. If the copy signal is set as valid, the read address pointer returns to a packet header read address from a corresponding packet end read address; otherwise, the read address pointer still stays at its current position.

Suppose that a data packet is read and write data. If the write address pointer returns to the packet header write address from the corresponding packet end write address, in any subsequent write operations, the written data packet may be cancelled, i.e. the packet is lost. If the read address pointer returns to the packet header read address from the corresponding packet end read address, the data packet is read again so as to copy the data packet.

In this embodiment, a copy function is not required. Therefore, only the packet loss function of the packet-level FIFO is reserved, and the address pointers of buffer blocks corresponding to all the data blocks of the currently-parsed input data packet are taken as the write data.

Thus, the packet-level FIFO for implementing the RLSQ1 in the embodiment includes the following signal ports connected with the input module:

a write address pointer, adapted to indicate a current write address, so as to enable the input module to write the address pointers of all buffer blocks corresponding to a current input data packet into the packet-level FIFO in turn one by one;

a header address pointer, adapted to indicate a packet header write address; the packet header write address indicates a write address in the packet-level FIFO for a buffer block corresponding to the packet header of the current input data packet;

an end address pointer, adapted to indicate a packet end write address; the packet end write address indicates a write address in the packet-level FIFO for a buffer block corresponding to the packet end of the current input data packet;

a loss signal, which may be set as valid by the input module after the current input data packet is successfully parsed, and which makes the write address pointer return to the packet header write address from the corresponding packet end write address so as to make the address pointers of all the buffer blocks corresponding to the successfully-parsed input data packet be covered by subsequent write operations and further to guarantee that the packet-level FIFO only records the address pointers of all buffer blocks corresponding to the incorrectly-parsed input data packet.

Figure 11A:
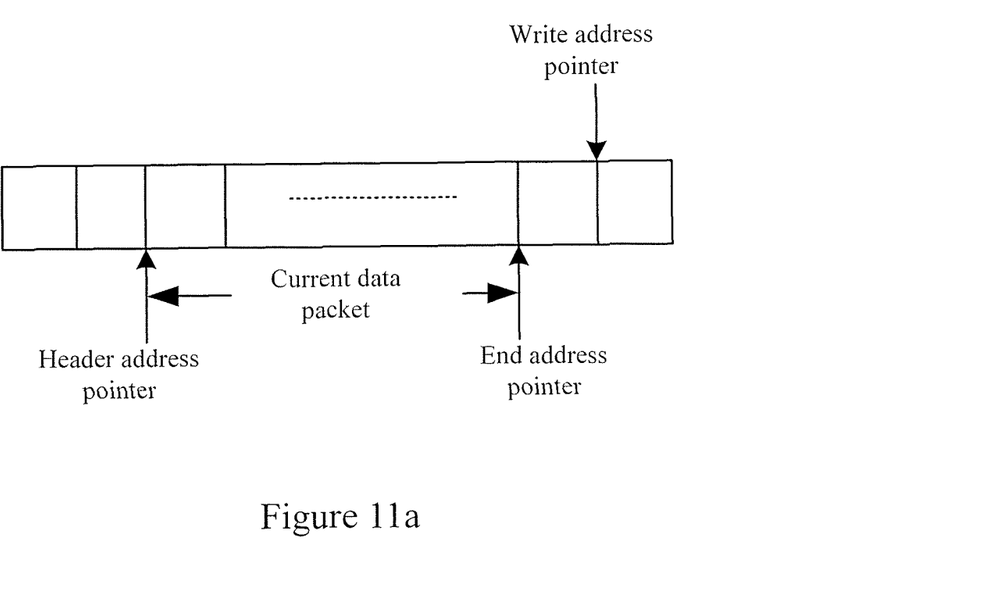
FIGS. 11a~11b are a schematic diagrams illustrating internal logic change of a packet-level FIFO according to an embodiment of the present invention.
Figure 11B:
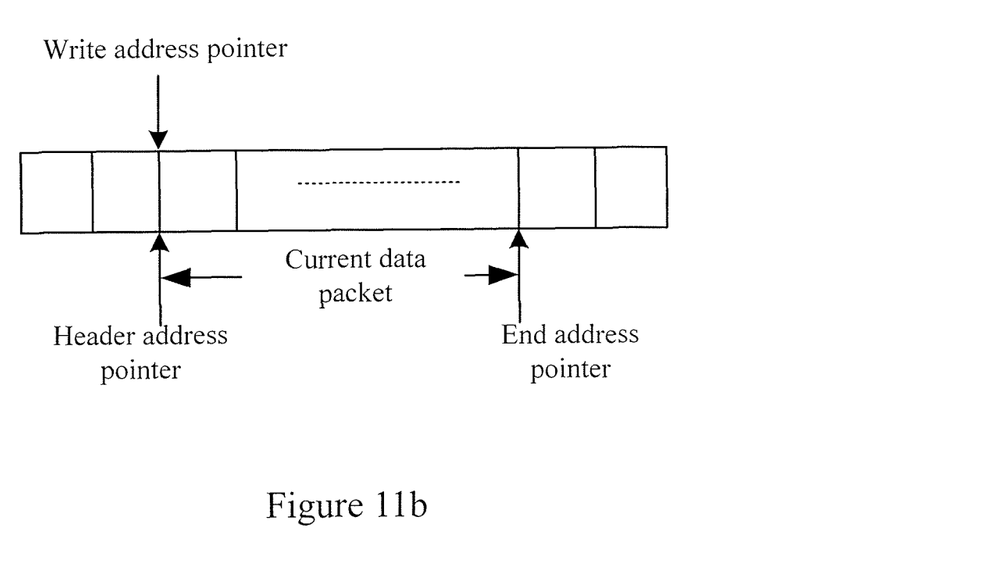

Thus, during a process of starting to parse the input data packet, the input module may first save the requested address pointers of the buffer blocks of all data blocks in the input data packet into the packet-level FIFO and then may flag a storage position of the address pointer of the packet header. With reference to FIG. 11*a*, if the current input data packet is found to be corret after the packet end of the current input data packet is parsed, the loss signal is set as valid and a next write position of the packet-level FIFO is adjusted to the flaged storage position of the address pointer of the packet header with reference to FIG. 11*b*, so as to ensure that all the address pointers of the correctly-parsed input data packet are covered by the subsequent write operations but not stored in the packet-level FIFO. If the current input data packet is found to be incorrect after the packet end of the current input data packet is parsed, the loss signal is set as invalid, and a next write position of the packet-level FIFO is still kept at a next storage position of the address pointer of the packet end as shown in FIG. 11*a*, so as to save all the address pointers of the incorrectly-parsed input data packet into the packet-level FIFO.

The forgoing are detailed descriptions of the buffer manager in the embodiment. Because the buffer manager may be implemented by computer programs running in a Field Programmable Gate Array (FPGA), an embodiment of the present invention further provides a buffer management method corresponding to a working flow of the computer programs. The buffer management method may be used to parse an input data packet and then save a successfully-parsed input data packet into a buffer, read and output a data packet from the buffer. The buffer management method includes steps of:

a) Record idle address pointers of idle buffer blocks in the buffer;

b) Request for address pointers from the idle address pointers for an input data packet, so as to enable an input module to save a correctly-parsed data packet into corresponding buffer blocks in the buffer;

c) Record next address pointers of the requested address pointers;

d) Look up the next address pointers of the requested address pointers, so as to enable an output module to read a data packet from the corresponding buffer blocks in the buffer;

e) Record address information of an incorrectly-parsed input data packet and address information of an output data packet, so as to release address pointers indicated by the address information.

It should be noted that, the above steps a)~e) need not be performed according to a fixed sequence and may be performed simultaneously.

Further more, in order to reduce hardware resources required to record an address pointer linked list, all address pointers of buffer blocks in the buffer may be divided into several groups at first. For example, the address pointers having the same higher bit may be included into one group, and preset ingroup numbers are lower bits of the address pointers in one group. More over, the step c) records an address pointer linked list in each group and records an address pointer linked list between the groups.

At this moment, the step c) may include: recording a preset ingroup number of a next address pointer which is pointed by a requested address pointer in each group and is in the same group; recording a next address pointer which is pointed by the requested address pointer in each group and is not in the same group, and recording a flag bit indicating that the requested address pointer is occupied. In practice, a RAM may be configured with a width equal to lower bits of an address pointer and with a depth equal to the total number of buffer blocks in the buffer, so as to record the preset ingroup number of the next address pointer which is pointed by the requested address pointer in each group and is in the same group. Further, a RAM may be configured with a width equal to the depth of one address pointer plus 1 and with a depth equal to the number of the groups, so as to record the next address pointer which is pointed by the requested address pointer in each group and is not in the same group, and to record the flag bit indicating that the requested address pointer is occupied.

Correspondingly, after releasing the requested address pointer corresponding to the flag bit indicating "occupied", the step e) further includes: setting the flag bit as "not occupied". When requesting for address pointers, it is required to request for the address pointers of the input data packet from the group where the address pointer with the flag bit set as "not occupied" is located and perform the request from the same group in priority.

Similarly, in order to reduce the hardware resources occupied by recording the idle address pointers, before the step a), the buffer management method may further include configuring idle pointer indicators corresponding respectively to the address pointers of all the buffer blocks in the buffer one by one. For example, a RAM with a width equal to 1 and with a depth equal to the total number of the buffer blocks in the buffer may be configured to record the idle pointer indicators. Further, in the step a), each idle pointer indicator is adapted to indicate whether a corresponding address pointer of a buffer block is idle.

Correspondingly, in the step b), it is necessary to select an address pointer corresponding to a valid idle pointer indicator as a requested address pointer and then set the idle pointer indicator as invalid. When performing releasing in the step e), it is necessary to set the idle pointer indicator as valid.

In addition, in order to increase efficiency for address release, the step e) may record address pointers of all buffer block corresponding to an incorrectly-parsed input data packet in real time, as well as address pointers of all buffer blocks corresponding to the output data packet in real time; and may release the address pointers of all buffer block corresponding to the incorrectly-parsed input data packet as well as the address pointers of all buffer blocks corresponding to the output data packet into an idle pointer unit.

Further, it is possible to use a preset packet-level FIFO, which has a write address pointer, a header address pointer, an end address pointer and a loss signal, to implement recording the address pointers of all the buffer blocks corresponding to the incorrectly-parsed input data packet in real time in the step e), and the implementing on every currently-parsed input data packet includes:

e1) by using a current write address indicated by the write address pointer of the packet-level FIFO, writing the address pointers of all the buffer blocks corresponding to a current input data packet as current write data into the packet-level FIFO in turn;

e2) by using a packet header write address indicated by the header address pointer of the packet-level FIFO, recording a write address in the packet-level FIFO for an address pointer of a buffer block corresponding to a packet header of the current input data packet; by using a packet end write address indicated by the end address pointer of the packet-level FIFO, recording a write address in the packet-level FIFO for an address pointer of a buffer block corresponding to a packet end of the current input data packet;

e3) setting the loss signal of the packet-level FIFO as valid after the current input data packet is parsed successfully, and making the write address pointer return to the packet header write address from the packet end write address, so as to make the address pointers of all buffer blocks corresponding to a correctly-parsed input data packet be covered by subsequent write operations and to ensure that the packet-level FIFO only records address pointers of all buffer blocks corresponding to an incorrectly-parsed data packet.

The foregoing is only embodiments of the present invention. The protection scope of the present invention, however, is not limited to the above description. Any change or substitution, easily occurring to those skilled in the art, should be covered by the protection scope of the present invention.

The invention claimed is:

1. A buffer manager based on an address pointer linked list, comprising:
    an idle pointer unit, configured to record an idle address pointer of an idle buffer block in a buffer;
    an address request unit, configured to request for an address pointer from the idle address pointer for an input data packet;
    a linked list information unit, configured to record a next address pointer of the address pointer requested;
    a linked list lookup unit, configured to look up the next address pointer of the address pointer requested;
    a first First In First Out memory (FIFO), configured to record address information of an incorrectly-parsed input data packet;
    a second FIFO, configured to record address information of an output data packet;
    an address release unit, configured to release the address pointer indicated by the address information into the idle pointer unit;

wherein the address pointers of all the buffer blocks in the buffer are divided into groups of a predetermined number; the address pointer of each buffer block in each group is sum of a preset ingroup number of each buffer block and a product of total number of buffer blocks in each group and a group number; in a group, address pointers have a same higher bit and different lower bits, one predetermined address pointer in the group is configured to point to a different group and the other address pointers in the group except the predetermined address pointer respectively is configured to point to the address pointers in the group;

wherein the linked list information unit is configured to record, for each group, lower bits of the address pointer pointed by the address pointer requested, the address pointer pointed by the predetermined address pointer requested, and a flag bit indicating whether the predetermined address pointer is occupied; and wherein the address request unit is configured to request for the address pointer for the input data packet from a group where the predetermined address pointer indicated by the flag bit as not occupied is located, and request for the address pointer in the same group in priority.

2. The buffer manager of claim 1, wherein the linked list information unit comprises:

a Random Access Memory (RAM) with a width equal to the lower bits of the address pointer and with a depth equal to a difference between the total number of the buffer blocks in the buffer and the number of the groups, configured to record the lower bits of the address pointer pointed by the address pointer requested; and a RAM with a width equal to a depth of the address pointer plus 1 and with a depth equal to the number of the groups, configured to record the address pointer pointed by the predetermined address pointer requested, and record the flag bit indicating whether the predetermined address pointer is occupied.

3. The buffer manager of claim 1, wherein the linked list information unit comprises:

a RAM with a width equal to the total number of the lower bits of the address pointers pointing to the address pointers in the same group plus a sum of a depth of the address pointer and 1, and with a depth equal to the number of the groups.

4. The buffer manager of claim 1, wherein the idle pointer unit comprises an idle pointer indicator corresponding to each buffer block in the buffer, each idle pointer indicator is configured to indicate whether the address pointer corresponding to the buffer block is idle;

the address request unit is configured to select the address pointer corresponding to the idle pointer indicator indicating the address pointer is idle as the address pointer requested and set the idle pointer indicator as invalid; and the address release unit is configured to set the idle pointer indicator corresponding to the address pointer recorded in the first FIFO or the second FIFO as valid.

5. The buffer manager of claim 2, wherein the idle pointer unit comprises an idle pointer indicator corresponding to each buffer block in the buffer, each idle pointer indicator is configured to indicate whether the address pointer corresponding to the buffer block is idle;

the address request unit is configured to select the address pointer corresponding to the idle pointer indicator indicating the address pointer is idle as the address pointer requested and set the idle pointer indicator as invalid; and the address release unit is configured to set the idle pointer indicator corresponding to the address pointer recorded in the first FIFO or the second FIFO as valid.

6. The buffer manager of claim 3, wherein the idle pointer unit comprises an idle pointer indicator corresponding to each buffer block in the buffer, each idle pointer indicator is configured to indicate whether the address pointer corresponding to the buffer block is idle;

the address request unit is configured to select the address pointer corresponding to the idle pointer indicator indicating the address pointer is idle as the address pointer requested and set the idle pointer indicator as invalid; and the address release unit is configured to set the idle pointer indicator corresponding to the address pointer recorded in the first FIFO or the second FIFO as valid.

7. The buffer manager of claim 4, wherein the idle pointer unit is a RAM with a width equal to 1 and a depth equal to the total number of the buffer blocks in the buffer.

8. The buffer manager of claim 1, wherein the first FIFO is configured to record the address pointers of all buffer blocks corresponding to the incorrectly-parsed input data packet;

the second FIFO is configured to record the address pointers of all buffer blocks corresponding to the output data packet; and the address release unit is configured to directly release the address pointers recorded in the first FIFO or the second FIFO into the idle pointer unit.

9. The buffer manager of claim 2, wherein the first FIFO is configured to record the address pointers of all buffer blocks corresponding to the incorrectly-parsed input data packet;

the second FIFO is configured to record the address pointers of all buffer blocks corresponding to the output data packet; and the address release unit is configured to directly release the address pointers recorded in the first FIFO or the second FIFO into the idle pointer unit.

10. The buffer manager of claim 3, wherein the first FIFO is configured to record the address pointers of all buffer blocks corresponding to the incorrectly-parsed input data packet;

the second FIFO is configured to record the address pointers of all buffer blocks corresponding to the output data packet; and the address release unit is configured to directly release the address pointers recorded in the first FIFO or the second FIFO into the idle pointer unit.

11. The buffer manager of claim 8, wherein the first FIFO is a packet-level FIFO and comprises signal ports comprising:

a write address pointer, configured to indicate a current write address in the packet-level FIFO for the address pointer of each buffer block corresponding to the input packet;

a header address pointer, configured to indicate a packet header write address, the packet header write address indicating a write address in the packet-level FIFO for a buffer block corresponding to a packet header of a current input data packet;

an end address pointer, configured to indicate a packet end write address, the packet end write address indicating a write address in the packet-level FIFO for a buffer block corresponding to a packet end of the current input data packet; and a loss signal, being set as valid after the current input data packet is successfully parsed, and making the write address pointer return to the packet header write address from the packet end write address to make the address pointers of all the buffer blocks corresponding to a successfully-parsed input data packet be covered and erased by subsequent write operations; or, being set as invalid after the current input data packet is incorrectly parsed and making the write address pointer stay at the current write address, so as to make the address pointers of all the buffer blocks corresponding to the incorrectly-parsed input data packet be recorded in the packet-level FIFO.

12. A buffer management method based on an address pointer linked list, comprising:

recording an idle address pointer of an idle buffer block in a buffer;

requesting for an address pointer from the idle address pointer for an input data packet;

recording a next address pointer of the address pointer requested;

looking up the next address pointer of the address pointer requested;

recording address information of an incorrectly-parsed input data packet and address information of an output data packet;

releasing the address pointer indicated by the address information;

wherein the address pointers of all the buffer blocks in the buffer are divided into groups of a predetermined number; the address pointer of each buffer block in each group is sum of a preset ingroup number of each buffer block and a product of total number of buffer blocks in each group and a group number; in a group, the address pointers have a same higher bit and different lower bits, one predetermined address pointer in the group is configured to point to a different group and the other address pointers in the group except the predetermined address pointer respectively is configured to point to the address pointers in the group;

wherein the recording the next address pointer of the address pointer requested comprises: recording, for each group, lower bits of the address pointer pointed by the address pointer requested, the address pointer pointed by the predetermined address pointer requested, and a flag bit indicating whether the predetermined address pointer is occupied; and wherein the requesting for the address pointer comprises:

requesting for the address pointer for the input data packet from a group where the predetermined address pointer indicated by the flag bit as not occupied is located, and requesting for the address pointer in the same group in priority.

13. The buffer management method of claim 12, further comprising:

configuring a Random Access Memory (RAM) with a width equal to the lower bits of the address pointer and with a depth equal to a difference between the total number of the buffer blocks in the buffer and the number of the groups, the RAM being configured to record the lower bits of the address pointer pointed by the address pointer requested; and configuring a RAM with a width equal to a depth of the address pointer plus 1 and with a depth equal to the number of the groups, the RAM being configured to record the address pointer pointed by the predetermined address pointer requested, and to record the flag bit indicating whether the predetermined address pointer is occupied.

14. The buffer management method of claim 12, further comprising:

configuring a Random Access Memory (RAM) with a width equal to the total number of the lower bits of the address pointers pointing to the address pointers in the same group plus a sum of a depth of the address pointer and 1, and with a depth equal to the number of the groups, being configured to record lower bits of the address pointer pointed by the address pointer requested, record the address pointer pointed by the predetermined address pointer requested, and the flag bit indicating whether the predetermined address pointer is occupied.

15. The buffer management method of claim 12, wherein the recording the idle address pointer of the idle buffer block in the buffer comprises:

configuring an idle pointer indicator corresponding to each buffer block in the buffer, each idle pointer indicator being configured to indicate whether the address pointer corresponding to the buffer block is idle;

the requesting for the address pointer comprises:

selecting the address pointer corresponding to a the idle pointer indicator indicating the address pointer is idle as the address pointer requested and setting the idle pointer indicator as invalid; and the releasing the address pointer comprises:

setting the idle pointer indicator as valid.

16. The buffer management method of claim 13, wherein the recording the idle address pointer of the idle buffer block in the buffer comprises:

configuring an idle pointer indicator corresponding to each buffer block in the buffer, each idle pointer indicator being configured to indicate whether the address pointer corresponding to the buffer block is idle;

the requesting for the address pointer comprises:

selecting the address pointer corresponding to a the idle pointer indicator indicating the address pointer is idle as the address pointer requested and setting the idle pointer indicator as invalid; and the releasing the address pointer comprises:

setting the idle pointer indicator as valid.

17. The buffer management method of claim 14, wherein the recording the idle address pointer of the idle buffer block in the buffer comprises:

configuring an idle pointer indicator corresponding to each buffer block in the buffer, each idle pointer indicator being configured to indicate whether the address pointer corresponding to the buffer block is idle;

the requesting for the address pointer comprises:

selecting the address pointer corresponding to a the idle pointer indicator indicating the address pointer is idle as the address pointer requested and setting the idle pointer indicator as invalid; and the releasing the address pointer comprises:

setting the idle pointer indicator as valid.

18. The buffer management method of claim 15, further comprising:

configuring a RAM with a width equal to 1 and a depth equal to the total number of the buffer blocks in the buffer, configured to record the idle pointer indicators.

19. The buffer management method of claim 12, wherein the recording the address information of the incorrectly-parsed input data packet and the address information of the output data packet comprise:
  recording address pointers of all buffer blocks corresponding to the incorrectly-parsed input data packet, and address pointers of all buffer blocks corresponding to the output data packet; and
  wherein the releasing the address pointer indicated by the address information comprising:
  directly releasing the recorded address pointers of all the buffer blocks corresponding to the incorrectly-parsed input data packet, and the recorded address pointers of all the buffer blocks corresponding to the output data packet.

20. The buffer management method of claim 13, wherein the recording the address information of the incorrectly-parsed input data packet and the address information of the output data packet comprise:
  recording address pointers of all buffer blocks corresponding to the incorrectly-parsed input data packet, and address pointers of all buffer blocks corresponding to the output data packet; and
  wherein the releasing the address pointer indicated by the address information comprising:
  directly releasing the recorded address pointers of all the buffer blocks corresponding to the incorrectly-parsed input data packet, and the recorded address pointers of all the buffer blocks corresponding to the output data packet.

21. The buffer management method of claim 14, wherein the recording the address information of the incorrectly-parsed input data packet and the address information of the output data packet comprise:
  recording address pointers of all buffer blocks corresponding to the incorrectly-parsed input data packet, and address pointers of all buffer blocks corresponding to the output data packet; and
  wherein the releasing the address pointer indicated by the address information comprising:
  directly releasing the recorded address pointers of all the buffer blocks corresponding to the incorrectly-parsed input data packet, and the recorded address pointers of all the buffer blocks corresponding to the output data packet.

22. The buffer management method of claim 19, wherein the recording the address pointers of all the buffer blocks corresponding to the incorrectly-parsed input data packet comprises:
  configuring a packet-level First In First Out memory (FIFO) comprising a write address pointer, a header address pointer, an end address pointer and a loss signal;
  writing, by using a current write address indicated by the write address pointer of the packet-level FIFO, the address pointer of each buffer block corresponding to a current input data packet as current write data into the packet-level FIFO in turn;
  recording, by using a packet header write address indicated by the header address pointer of the packet-level FIFO, a write address in the packet-level FIFO for the address pointer of a buffer block corresponding to a packet header of the current input data packet; recording, by using a packet end write address indicated by the end address pointer of the packet-level FIFO, a write address in the packet-level FIFO for the address pointer of a buffer block corresponding to a packet end of the current input data packet;
  after the current input data packet is parsed successfully, setting the loss signal of the packet-level FIFO as valid, and making the write address pointer return to the packet header write address from the packet end write address, so as to make address pointers of all buffer blocks corresponding to a correctly-parsed input data packet be covered by subsequent write operations; and
  after the current input data packet is parsed incorrectly, setting the loss signal of the packet-level FIFO as invalid, and making the write address pointer stay at the current write address so as to make address pointers of all buffer blocks corresponding an incorrectly-parsed data packet be recorded into the packet-level FIFO.

23. A packet-level First In First Out memory (FIFO) applied to the buffer management method according to claim 12, comprising:
  a storage queue; and
  signal ports comprising: a write address pointer indicating a current write address, a read address pointer indicating a current read address, a header address pointer indicating a packet header, an end address pointer indicating a packet end; and
  a counter configured to calculate all stored data to determine whether the packet-level FIFO is full;
  wherein the packet-level FIFO further comprises signal ports comprising: a loss signal and a copy signal;
  wherein if the loss signal is set as valid, the write address pointer returns to a write address of the packet header indicated by the header address pointer from a write address of the packet end indicated by the end address pointer corresponding to the header address pointer; otherwise, the write address pointer still stays at the current write address;
  wherein if the copy signal is set as valid, the read address pointer returns to a read address of the packet header indicated by the header address pointer from a read address of the packet end indicated by the end address pointer corresponding to the header address pointer; otherwise, the read address pointer still stays at a current write address.

24. The buffer manager of claim 1, wherein the address pointer of each buffer block in each group is a sum of a preset ingroup number of each buffer block and a product of a total number of the buffer blocks in each group and a group number.

25. The buffer management method of claim 12, wherein the address pointer of each buffer block in each group is a sum of a preset ingroup number of each buffer block and a product of a total number of the buffer blocks in each group and a group number.

* * * * *

UNITED STATES PATENT AND TRADEMARK OFFICE
CERTIFICATE OF CORRECTION

PATENT NO.        : 8,499,105 B2                                  Page 1 of 1
APPLICATION NO.   : 12/782823
DATED             : July 30, 2013
INVENTOR(S)       : Wang It is certified that error appears in the above-identified patent and that said Letters Patent is hereby corrected as shown below:

In the Claims

Column 16, line 28, in Claim 15, delete "a the" and insert -- the --, therefor.

Column 16, line 43, in Claim 16, delete "a the" and insert -- the --, therefor.

Column 16, line 57, in Claim 17, delete "a the" and insert -- the --, therefor.

Signed and Sealed this
Seventh Day of January, 2014

Margaret A. Focarino
*Commissioner for Patents of the United States Patent and Trademark Office*